United States Patent
Lau et al.

(10) Patent No.: US 6,552,468 B2
(45) Date of Patent: Apr. 22, 2003

(54) ROTOR

(75) Inventors: Kevin King Wai Lau, Hong Kong (HK); Man Yiu Ho, Hong Kong (HK)

(73) Assignee: Johnson Electric S.A., La Chaux-de-Fonds (CH)

( * ) Notice: Subject to any disclaimer, the term of this patent is extended or adjusted under 35 U.S.C. 154(b) by 120 days.

(21) Appl. No.: 09/805,053

(22) Filed: Mar. 14, 2001

(65) Prior Publication Data

US 2001/0022483 A1 Sep. 20, 2001

(30) Foreign Application Priority Data

Mar. 14, 2000  (GB) ............................................. 0005989

(51) Int. Cl.$^7$ ................................................ H02K 3/46
(52) U.S. Cl. ...................................................... 310/270
(58) Field of Search ................................. 310/270, 260, 310/261, 43, 91; H02K 3/38

(56) References Cited

U.S. PATENT DOCUMENTS 4,315,363 A * 2/1982 Barone ........................ 29/596
4,967,111 A * 10/1990 Andrieux ...................... 310/90
5,449,963 A * 9/1995 Mok ............................ 310/216

FOREIGN PATENT DOCUMENTS

| EP | A1630095 | 7/1994 |
| JP | A919088 | 1/1997 |

* cited by examiner

*Primary Examiner*—Nestor Ramirez
*Assistant Examiner*—Nguyen Hanh
(74) *Attorney, Agent, or Firm*—Birch, Stewart, Kolasch & Birch, LLP

(57) ABSTRACT

A wound rotor 10 for an electric motor has a shaft 12, an insulating spacer 28 fitted to the shaft, a rotor core 18 and commutator 20 fitted to the spacer and windings 24 wound around poles of the rotor core and terminated on the commutator. A first end of the spacer 28 remote from the commutator 20 has an axially extending recess forming an annular space 30 with the shaft 12. A winding shield 32 having a tubular portion 34 and a radially extending portion 36 is fitted to the shaft 12 such that the tubular portion 34 is located within the annular space 30. The winding shield increases the electrical clearance distance and creepage distance between the windings and the shaft and/or bearing located on the shaft adjacent the shield.

9 Claims, 2 Drawing Sheets

ROTOR

FIELD OF THE INVENTION

This invention relates to electric motors and in particular, to a wound rotor for use in an electric motor.

DESCRIPTION OF THE PRIOR ART

Electric motors are very common in household appliances and hand held power tools. However, one modern trend is to make appliances smaller and lighter which requires smaller and lighter components including the electric motor which must maintain its output power.

Safe manufacturing regulations require certain safety standards to ensure consumer safety. Two of these requirements of concern in electric motor design are electrical clearance distance and electrical creepage distance. Electrical clearance distance is the minimum allowed distance between an electrically live part (such as the rotor windings) and a conductive part which could come into contact with the user, e.g., a motor shaft or metal housing. The creepage distance is similar to the clearance distance except that the distance is measured along the surface of the insulator supporting the live part, i.e., the windings.

As the size of the motor is reduced, the clearance and creepage distances are reduced as well, to the point where they are at the allowed minimum. However, further reduction in motor size is required, requiring careful consideration of clearance and creepage distance issues.

SUMMARY OF THE INVENTION

The present invention provides a way to reduce the overall length of the rotor without compromising the clearance and creepage distance requirements. This is achieved by providing a rotor which has a winding shield which has an integral axial extension which locates within an annular recess in a spacer which supports an end of the armature windings. The winding shield extends radially between the bearing and the armature winding to increase the creepage and clearance distances.

Accordingly, in one aspect thereof, the present invention provides a wound rotor for an electric motor comprising a shaft, a rotor core fixed for rotation with the shaft, a commutator fixed for rotation with the shaft and located adjacent one end of the rotor core, windings wound about poles of the rotor core and terminated on the commutator, a spacer of insulating material fixed to the shaft and located adjacent the other end of the rotor core and supporting an end of the windings and a radially extending winding shield fixed to the shaft and located at a first end of the spacer adjacent to the rotor core wherein the first end of the spacer has an axially extending recess and the winding shield has an axially extending tubular projection which is located within the recess of the spacer.

The shield of the rotor can be arranged to function as an oil slinger.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

One preferred embodiment of the invention will now be described, by way of example only, with reference to the accompanying drawings, given by way of illustration only, and thus are not limitative of the present invention, and in which.

DESCRIPTION OF THE PREFERRED EMBODIMENTS

Figure 1:
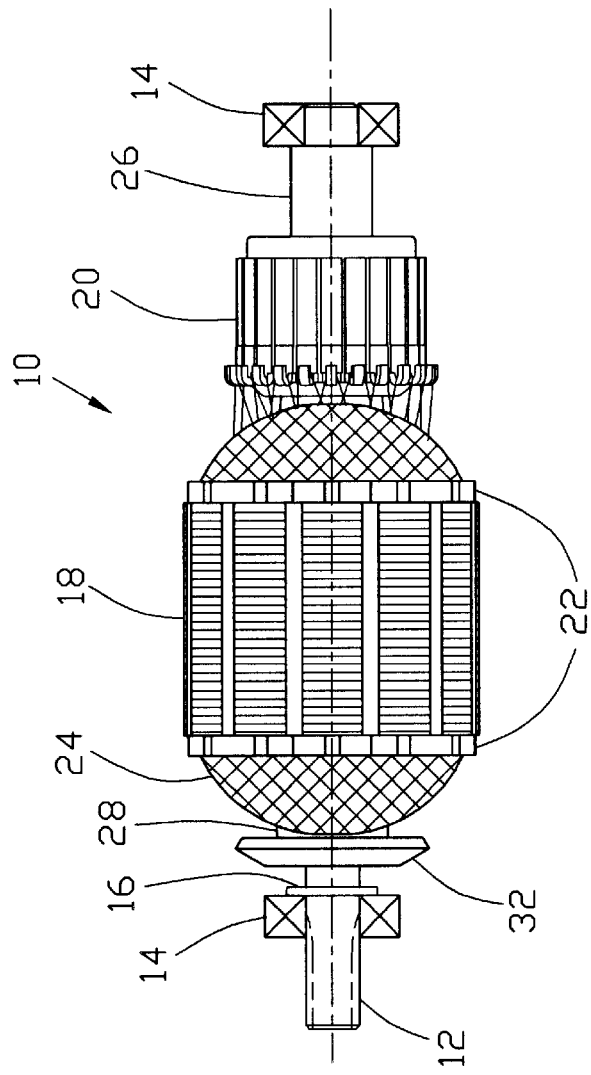
FIG. 1 illustrates an assembled wound rotor according to the preferred embodiment.

As shown in FIG. 1, the rotor 10 comprises a shaft 12 having bearings 14 fitted to either end. A circlip 16 locates the bearing at a first end of the shaft.

A rotor core 18 and a commutator 20 are fixed to rotate with the shaft. The rotor core 18 is a stack of steel laminations forming a plurality of armature poles. Armature end protectors or spiders 22 are located at each end of the rotor core. Windings 24 are wound around the poles of the rotor core 18 and are terminated on the commutator 20.

Figure 2:
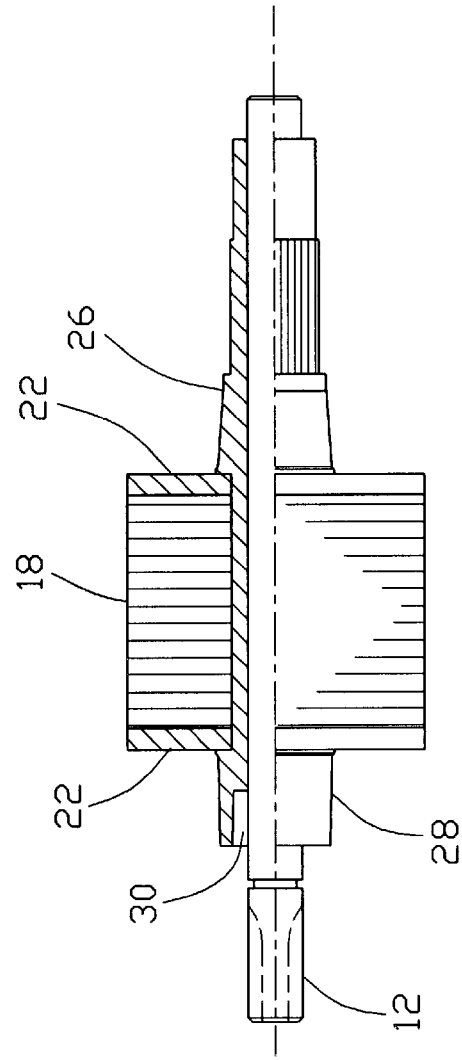
FIG. 2 is a part sectional view of the rotor of FIG. 1 in a partially assembled state.

A winding shield 32 is located between the bearing 14 and the winding 24 at the non-commutator end (first end) of the rotor. As can be seen in FIG. 2, the rotor core 18 is fitted to the shaft 12 by way of an insulating sleeve 26 which extends substantially along the shaft 12 as is known for double insulated wound rotors. The sleeve 26 is an insert molded part and is formed with an integral spacer at both ends of the shaft 12 as well as supporting the commutator 20. The integral spacer 28 at the non-commutator end has an axially extending recess which forms an annular space 30 with the shaft. The first spacer 28 supports the ends or head of the rotor windings 24 at the first end of the rotor preventing the windings 24 from making direct contact with the shaft 12.

Figure 3:
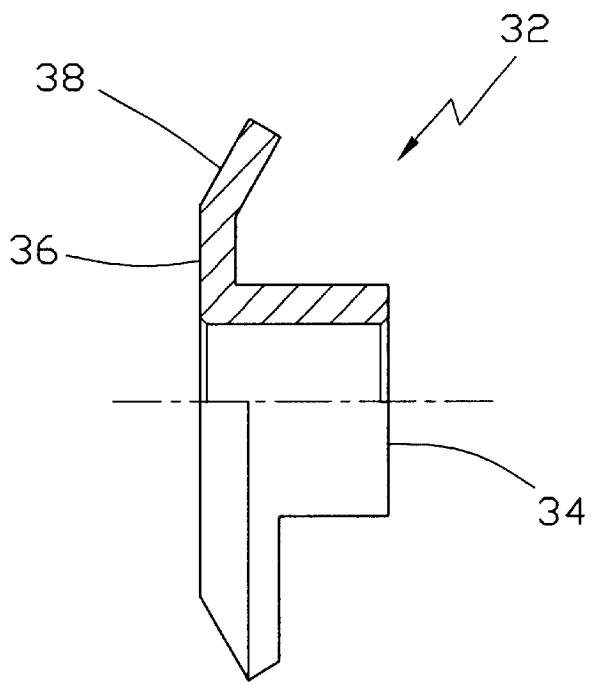
FIG. 3 is a part sectional side view of a winding shield, being part of the rotor assembly of FIG. 1.

FIG. 3 illustrates in partial section the winding shield 32. The winding shield 32 has an axially extending tubular portion 34 and a radially extending portion 36. The tubular portion 34 acts as a boss fitting the winding shield to the shaft 12. The radially outer edge 38 of the radially extending portion 36 is bent or axially inclined towards the rotor core.

Figure 4:
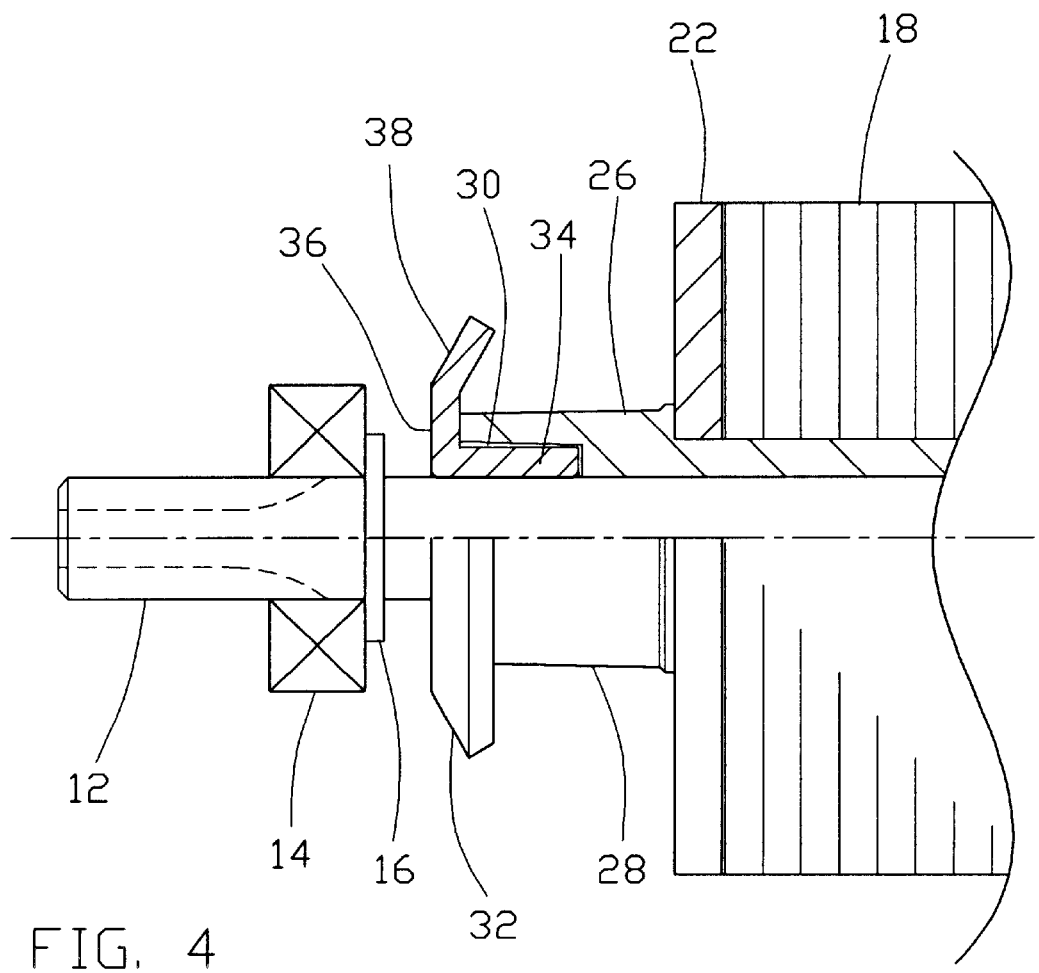
FIG. 4 is an enlarged part sectional view of a first end of the rotor of FIG. 1.

FIG. 4 shows an enlarged view of the first end of the rotor illustrating the connection between the shield 32 and the first spacer 28. The tubular portion 34 fits over the shaft and is located within the annular space 30 while the radially extending portion abuts the axial end of the first spacer 28. The tubular portion 34 may be a press fit on the shaft or a press fit within the recess in the spacer. Alternatively, adhesive may be applied in the annular space 30 to fix the shield 32 to the shaft 12 and sleeve 26. As seen here, the outer edge of the shield 38 is inclined towards the rotor core 18. In this way, it causes less resistance to cooling air flowing from left to right along the rotor as illustrated. Alternatively, the outer edge of the shield could be inclined in the opposite direction if the air flow was in the opposite direction. If cooling air flow is not significant, the outer edge 38 of the shield could extend radially only.

As can be seen in FIG. 4, the winding shield 32 increases the clearance distance by the radially extending portion 36 providing a physical barrier between the windings 24 (shown in FIG. 1) and the shaft 12, bearing 14 or other conductive elements which may be located near the first end of the rotor core, such as a metal fan or a metal bearing support bracket or housing part. The tubular portion 34 by extending under the spacer 28 increases the creepage distance while preventing individual turns of the winding from slipping off the end of the spacer 28 and coming into contact with the shaft 12.

While only one embodiment has been described, other embodiments and variations will be apparent to those skilled in the art and it is intended to cover all such variations which fall within the scope of the invention as defined by the appended claims.

What is claimed is:

1. A wound rotor for an electric motor comprising a shaft, a rotor core fixed for rotation with the shaft, a commutator fixed for rotation with the shaft and located adjacent one end of the rotor core, windings wound about poles of the rotor core and terminated on the commutator, a spacer of insulating material fixed to the shaft and located adjacent the other end of the rotor core and supporting an end of the windings and a radially extending winding shield mounted about the shaft and located at a first end of the spacer wherein the first end of the spacer has an axially extending recess and the winding shield has an axially extending tubular projection which is located within the recess of the spacer.

2. The rotor of claim 1 wherein the tubular projection is a press fit in the recess of the spacer.

3. The rotor of claim 1 wherein the recess in the spacer forms an annular space with the shaft and the tubular projection is a press fit in the annular space.

4. The rotor of claim 1 wherein the spacer is an integral part of a sleeve which extends from one end of the shaft to the other end and insulates the rotor core from the shaft.

5. The rotor of claim 4 wherein the commutator is fitted to the sleeve.

6. The rotor of claim 1 wherein the shield is arranged to function as an oil slinger.

7. The rotor of claim 1 wherein the shield is fixed to the spacer by adhesive.

8. The rotor of claim 1 wherein a radially outer edge of the shield is bent in the direction of flow of cooling air along the rotor.

9. The rotor of claim 1 wherein a radially outer edge of the shield extends axially towards the rotor core.

* * * * *